United States Patent
Konomi et al.

(10) Patent No.: US 10,087,862 B2
(45) Date of Patent: Oct. 2, 2018

(54) ENGINE CONTROL DEVICE

(71) Applicant: MAZDA MOTOR CORPORATION, Hiroshima (JP)

(72) Inventors: Kenjiro Konomi, Hiroshima (JP); Kenko Ujihara, Higashi Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/373,961

(22) Filed: Dec. 9, 2016

(65) Prior Publication Data

US 2017/0184042 A1 Jun. 29, 2017

(30) Foreign Application Priority Data

Dec. 25, 2015 (JP) ................. 2015-255325

(51) Int. Cl.
*F02D 41/10* (2006.01)
*F02D 31/00* (2006.01)
*F16H 63/50* (2006.01)
*G01P 3/44* (2006.01)
*F16H 59/70* (2006.01)

(52) U.S. Cl.
CPC ........... *F02D 41/10* (2013.01); *F02D 31/001* (2013.01); *F16H 63/50* (2013.01); *G01P 3/44* (2013.01); *F02D 2200/101* (2013.01); *F02D 2200/1012* (2013.01); *F02D 2200/602* (2013.01); *F02D 2250/14* (2013.01); *F02D 2250/26* (2013.01); *F02D 2250/28* (2013.01); *F16H 59/70* (2013.01)

(58) Field of Classification Search
CPC .... F02D 41/10; F02D 31/001; F02D 2250/28; F02D 2250/26; F02D 2250/14; F02D 2200/101; F02D 2200/1012
See application file for complete search history.

(56) References Cited

U.S. PATENT DOCUMENTS

| 5,243,951 A | * | 9/1993 | Nakaniwa | F02D 41/1454 123/674 |
| 2011/0087408 A1 | * | 4/2011 | Aso | B60W 30/20 701/54 |
| 2013/0319355 A1 | * | 12/2013 | Nishihashi | F01L 1/022 123/90.15 |

FOREIGN PATENT DOCUMENTS

JP 2005-155412 A 6/2005

\* cited by examiner

*Primary Examiner* — Hung Q Nguyen
*Assistant Examiner* — Xiao Mo
(74) *Attorney, Agent, or Firm* — Studebaker & Brackett PC (57) ABSTRACT

A PCM (60) as an engine control device comprises a torque controlling unit (65) configured to control an engine torque based on an accelerator actuated amount. The torque controlling unit (65) is configured, after an accelerator actuated amount is started to increase, and when a rolling movement is being produced in a power train (PT) which includes at least an engine fixed to a vehicle body by an engine mount, to control for limiting increase in the engine torque so as to make an actual increase rate of the engine torque smaller than a nominal increase rate of the engine torque according to an increase in the accelerator actuated amount, in order to suppress the rolling movement.

9 Claims, 8 Drawing Sheets

ENGINE CONTROL DEVICE

BACKGROUND OF THE INVENTION

Field of the Invention

The present invention relates to an engine control device, and more particularly to an engine control device for controlling engine torque based on an accelerator actuated amount or the like.

Description of Related Art

When a vehicle is to be accelerated (especially when a vehicle movement is changed from a deceleration mode to an acceleration mode), vibration may occur in the vehicle if engine torque is increased abruptly, so that a control has conventionally been adopted to have the engine torque increased slowly for suppressing such possible vibration. However, if the engine torque is increased slowly, vibration at the time of acceleration may be suppressed but there is a negative effect that acceleration performance comes down. A technique for solving such a problem is disclosed in Patent Document 1 (Japanese Laid-Open Patent Publication 2005-155412 A), for example.

The Patent Document 1 discloses a technique to control engine torque so as to achieve a good balance between suppression of longitudinal vibration of a vehicle body caused by torsional vibration of a drive shaft, and acceleration performance. Specifically, in this technique, when rate of depressing an accelerator pedal is high, a control is performed which permits a longitudinal vibration of the vehicle for a certain degree to increase engine torque abruptly, and when rate of depressing the accelerator pedal is low, another control is performed in which engine torque is increased moderately in order to suppress the longitudinal vibration of the vehicle.

BRIEF SUMMARY OF THE INVENTION

Technical Problem

Meanwhile, in an early stage of acceleration of a vehicle, in other words, when engine torque is started to be increased, a rolling movement may be produced about an engine longitudinal axis parallel to the crankshaft in a unit (typically a power train) fixed to the vehicle body by an engine mount. If engine torque is increased abruptly at this point, a swift rolling movement may be produced in the power train and may result in vibration (particularly, a shock may occur). The technique disclosed in the above Patent Document 1 tries to suppress the longitudinal vibration of the vehicle body caused by the torsional vibration of the drive shaft, but since it does not at all consider the rolling movement of the power train, the vibration caused by the rolling movement is not suppressed appropriately.

The present invention has been made to solve the above conventional problem, and an object thereof is to provide an engine control device capable of suppressing vibration caused by a rolling movement of a power train appropriately while maintaining an acceleration performance.

Solution to Problem

In order to achieve the above object, according to the present invention, there is provided an engine control device, including an engine speed acquiring unit configured to acquire an engine speed, an accelerator actuated amount acquiring unit configured to acquire an accelerator actuated amount, a torque controlling unit configured to control an engine torque based on the accelerator actuated amount acquired by the accelerator actuated amount acquiring unit, wherein the torque controlling unit is configured to control to limit an increase in the engine torque so as to make an actual increase rate of the engine torque smaller than a nominal increase rate of the engine torque according to an increase in the accelerator actuated amount, in order to suppress a rolling movement of a power train which includes at least an engine fixed to a vehicle body by an engine mount, when the rolling movement is being produced in the power train after the accelerator actuated amount is started to increase.

According to the present invention having the above features, since increase in the engine torque is limited so as to suppress the rolling movement of the power train during the rolling movement, the rolling movement by the power train PT may be produced at low speed, and thus, the engine mount is quickly damped to appropriately reduce the rolling movement of the power train. Therefore, the vibration caused by the rolling movement of the power train may be suppressed appropriately. In addition, according to the invention, since torque is limited corresponding to a phenomenon (the rolling movement of the power train) which may become an governing factor of vibration, increase in the engine torque is not limited more than necessary, and thus, it is possible to maintain an acceleration performance of the vehicle.

In the present invention, the torque controlling unit is preferably configured to: calculate at least one of angular speed, angular acceleration and angular jerk of a crank shaft from the engine speed acquired by the engine speed acquiring unit; and determine a start timing and an end timing of the control for limiting increase in the engine torque so as to suppress the rolling movement of the power train, based on at least one of the angular speed, the angular acceleration and the angular jerk.

According to the present invention having the above features, it is possible to determine the rolling movement of the power train based on at least one of the angular speed, angular acceleration and angular jerk of the crank shaft, which can be acquired from the engine speed, to start and terminate the control for suppressing the rolling movement at an appropriate timing.

In the present invention, the torque controlling unit is preferably configured to: calculate the angular jerk of the crank shaft, and a ratio of change of the angular speed which is determined based on values of the angular speed taken at successional timings along a time axis with regard to the angular speed of the crank shaft, based on the engine speed acquired by the engine speed acquiring unit; and start to limit the increase in the engine torque so as to suppress the rolling movement of the power train, when the angular jerk is of a positive value and the ratio of change of the angular speed exceeds a predetermined value which is equal to or larger than 1.

According to the present invention constructed as described above, it is possible to determine the condition of the rolling movement of the power train accurately to start the control for suppressing the rolling movement at an optimal timing.

In the present invention, the torque controlling unit is preferably configured to end the control for limiting the increase in the engine torque so as to suppress the rolling movement of the power train, when the angular jerk is equal to or smaller than a predetermined value and the ratio of change of the angular speed is started to decrease.

According to the present invention constructed as described above, it is possible to determine the end of the rolling movement of the power train accurately to terminate the control for suppressing the rolling movement at an optimal timing.

In the present invention, preferably, after performing the control for limiting the increase in the engine torque so as to suppress the rolling movement of the power train, the torque controlling unit is further configured to make the actual increase rate of the engine torque larger than the increase rate of the engine torque at the time of limiting the increase in the engine torque so as to suppress the rolling movement of the power train, in order to override a reaction force generated in a drive shaft when the drive shaft which has been twisted by the torque transmitted from the engine restores its untwisted condition.

According to the present invention constructed as described above, since the limiting of increase in the engine torque is canceled to increase the engine torque so as to override the a reaction force generated in a drive shaft when the drive shaft which has been twisted by the torque transmitted from an engine restores its untwisted condition, the power train is prevented from being pushed backward by the reaction force of the drive shaft so that a condition in which a force is applied to the power train toward a driving direction may be appropriately maintained. This operation may prevent another rolling movement or the like of the power train from being produced.

In the present invention, the torque controlling unit is preferably configured to make the actual increase rate of the engine torque equal to or higher than the increase rate of the engine torque according to the increase in the accelerator actuated amount, in order to override the reaction force.

According to the present invention constructed as described above, it is possible to effectively prevent the power train from being pushed backward by the reaction force of the drive shaft.

In the present invention, preferably, in accordance with a transmission gear stage, the torque controlling unit is configured to change the increase rate of the engine torque.

According to the present invention having the above feature, it is possible to apply the increase rate of the engine torque in accordance with to a transmission gear stage.

In the present invention, the torque controlling unit is preferably configured to: set a target acceleration of the vehicle based on the accelerator actuated amount; control the engine using a target engine torque for realizing the target acceleration so as to increase the engine torque according to the increase in the accelerator actuated amount; and change the target engine torque when the actual increase rate of the engine torque is changed from the nominal increase rate of the engine torque according to the increase in the accelerator actuated amount.

In the present invention, the engine speed acquiring unit may be preferably configured to acquire the engine speed at least two times or more, within a range of 180 degrees of a crank angle.

In the present invention, preferably, by using a pendulum type, the power train may be fixed to the vehicle body by the engine mount.

The engine control device of the present invention can appropriately suppress vibration caused by the rolling movement of a power train while maintaining the acceleration performance.

DETAILED DESCRIPTION OF THE INVENTION

With reference to the accompanying drawings, an engine control device according to one embodiment of the present invention will now be described.

[System Configuration]

Figure 1:
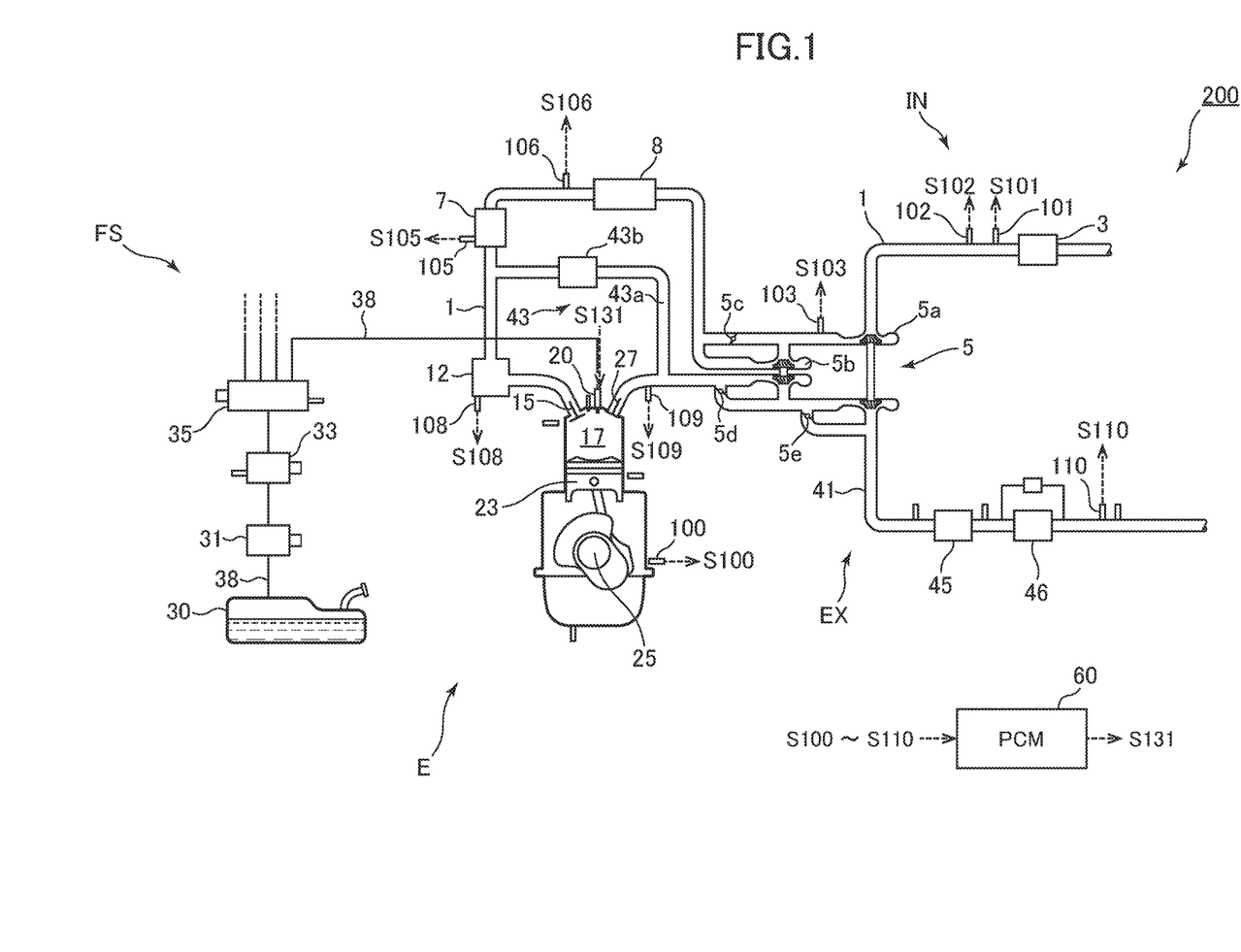
FIG. 1 is a schematic configuration diagram of an engine system to which an engine control device according to one embodiment of the present invention is applied.

First of all, with reference to FIG. 1, an engine system to which an engine control device according to one embodiment of the present invention is applied is described. FIG. 1 is a schematic configuration diagram of an engine system to which an engine control device according to one embodiment of the present invention is applied.

As shown in FIG. 1, an engine system 200, mainly, comprises an engine E such as a diesel engine, an air intake system IN for supplying intake air to the engine E, a fuel supply system FS for supplying fuel to the engine E, an exhaust gas system EX for discharging exhaust gas of the engine E, sensors 96 to 110 for detecting various parameters related to the engine system 200, and a PCM (Power-train Control Module) 60 for performing control of the engine system 200. The engine system 200 may be applied to a vehicle of front-engine, front-wheel drive type including an engine having a longitudinal axis parallel to a crankshaft arranged transversely with respect to the longitudinal axis of the vehicle body, for example.

First, the air intake system IN has an air intake channel 1 through which intake air passes, and on the air intake channel 1, there are provided, starting from the upstream side, an air cleaner 3 for cleaning air introduced from outside, a compressor of a turbo-supercharger 5 for compressing the passing intake air to raise intake air pressure, an intercooler 8 for cooling the intake air by outside air and/or cooling water, and an intake air shutter valve 7 for adjusting amount of the passing intake air, and a surge tank 12 for temporarily storing intake air to be supplied to the engine E.

In addition, in the intake air system IN, there are an air flow sensor 101 for detecting the amount of incoming air, and an intake air temperature sensor 102 for detecting the temperature of the intake air provided on the air intake air channel 1 immediately downstream of the air cleaner 3, an intake air pressure sensor 103 for detecting pressure of the intake air provided on the turbo-supercharger 5, an intake air temperature sensor 106 for detecting intake air temperature provided on the intake air channel 1 immediately downstream of the intercooler 8, an intake air shutter valve position sensor 105 for detecting position of the intake air shutter valve 7 provided on the intake air shutter vale 7, and an intake air pressure sensor 108 for detecting pressure of intake air at an air intake manifold provided on the surge tank 12. Each of such various sensors 101 to 108 provided in the air intake system IN outputs detection signals S101 to S108 corresponding to detected parameters to the PCM 60.

Next, the engine E has an air intake valve 15 for introducing the intake air supplied from the air intake channel 1 (specifically the air intake manifold) to a combustion chamber 17, a fuel injector 20 for injecting fuel into the combustion chamber 17, a piston 23 which performs reciprocating motion under the combustion of fuel-air mixture inside the combustion chamber 17, a crank shaft 25 rotated by the reciprocating motion of the piston and an exhaust gas valve 27 for discharging exhaust gas generated by the combustion of fuel-air mixture inside the combustion chamber 17 to an exhaust gas channel 41. In addition, the engine E is provided with a crank angle sensor 100 for detecting a crank angle as a rotation angle which is based on a top dead center of the crank shaft 25, and the crank angle sensor 100 outputs a detection signal S100 corresponding to the detected crank angle to the PCM 60, and the PCM 60 acquires an engine speed based on the detection signal 100. Basically, the crank angle sensor 100 outputs the detection signal S100 for at least two or more times during the crank shaft 25 is rotated by 180 degrees. For example, the crank angle sensor 100 outputs the detection signal S100 every time the crank shaft 25 is rotated by 30 degrees, in other words, crank angle at every 30 degrees is detected.

Next, the fuel supply system FS has a fuel tank 30 for storing fuel, a fuel supplying channel 38 for supplying fuel from the fuel tank 30 to the fuel injector 20. The fuel supplying channel 38 is provided with, starting from the upstream side, a low pressure fuel pump 31, a high pressure fuel pump 33 and a common rail 35.

Next, the exhaust system EX has an exhaust gas channel 41 through which exhaust gas passes, and on the exhaust gas channel 41, there are provided, starting from the upstream side, a turbine of the turbo-supercharger 5 which is rotated by the passing exhaust gas, the rotation of the turbine in turn driving the compressor as described in the above, a diesel oxidation catalyst (DOC) 45 and a diesel particulate filter (DPF) 46 having a function for cleaning the exhaust gas. The DOC 45 is a catalyst for oxidizing hydrocarbon (HC) and/or carbon monoxide (CO) or the like using oxygen in discharged gas to convert HC and/or CO into water and carbon dioxide, the DPE 46 being a filter for collecting particulate matters (PM) in exhaust gas.

In addition, the exhaust gas system EX is provided in the exhaust gas channel 41 upstream of the turbine of the turbo-supercharger 5 with an exhaust gas pressure sensor 109 for detecting exhaust gas pressure, and on the exhaust gas channel 41 immediately downstream of the DPF 46 with a linear O2 sensor 110 for detecting oxygen concentration. Each of such various sensors 109 and 110 provided in the exhaust gas system EX outputs detection signals S109 and S110 corresponding to detected parameters to the PCM 60.

Also, in this embodiment, the turbo-supercharger 5 is configured as a two-stage supercharging system by which high supercharging may be achieved effectively over a whole range from a low rotating speed range where exhaust gas energy is low to a high rotating speed range. That is to say, the turbo supercharger 5 comprises a large turbocharger 5*a* for supercharging a large amount of air in the high speed rotating range, a small turbocharger 5*b* for allowing effective supercharging even with low exhaust gas energy, a compressor bypass valve 5*c* for controlling flow of the intake air to a compressor of the small turbocharger 5*b*, a regulator valve 5*d* for controlling flow of the exhaust gas to a turbine of the small turbocharger 5*b* and a waste gate valve 5*e* for controlling flow of the exhaust gas to a turbine of the large turbocharger 5*a*, and supercharging operation by the large turbocharger 5*a* and supercharging operation by the small turbocharger 5*b* is switched by driving each of the valves in accordance with operation condition of the engine E (engine speed and load).

The engine system 200 according to this embodiment also has an EGR unit 43. The EGR unit 43 has an EGR channel 43*a* which connects the exhaust gas channel 41 upstream of the turbine of the turbo supercharger 5 and the intake air channel 1 downstream of the compressor of the turbo supercharger 5 (specifically, downstream of the intercooler 8), and an EGR valve 43*b* which adjusts flow rate of the exhaust gas which is allowed to pass the EGR channel 43*a*. Exhaust gas amount (EGR gas amount) flowing back to the air intake system IN through the EGR unit 43 is generally determined in accordance with the exhaust gas pressure upstream of the turbine of the turbo supercharger 5, intake air pressure governed by the opening of the intake air shutter valve 7, and the opening of the EGR valve 43*b*.

Figure 2:
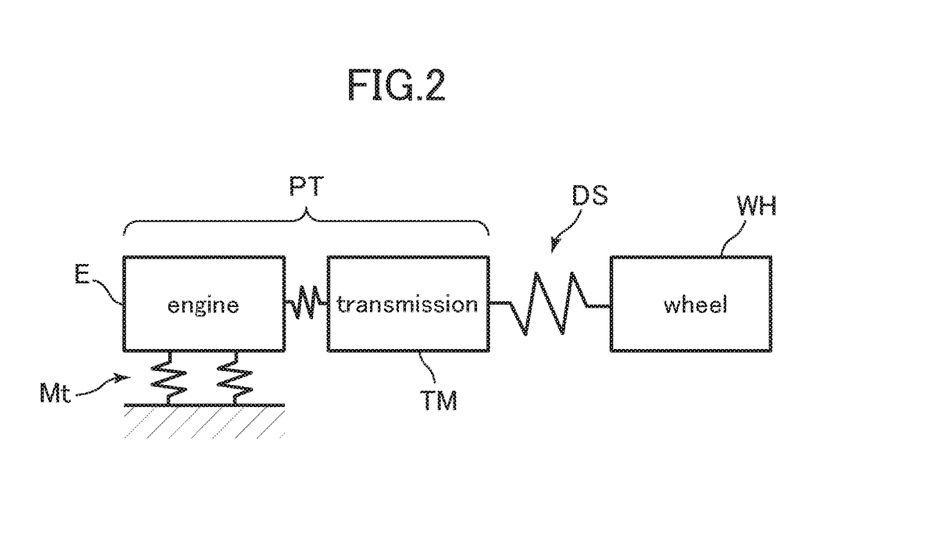
FIG. 2 is a schematic diagram depicting a torque transmission system of an engine according to one embodiment of the present invention.

Next, with reference to FIG. 2, an engine torque transmission system in an engine according to one embodiment of the present invention will be described. FIG. 2 is a schematic diagram depicting a torque transmission system of an engine according to one embodiment of the present invention.

As shown in FIG. 2, the engine E is fixed to a vehicle body by an engine mount Mt, and engine torque output from the engine E is transmitted to a transmission TM via a flywheel (not shown). In this embodiment, the engine E and the transmission TM (including the flywheel) are integrally assembled to configure a power train PT, and the entire power train PT is fixed to the vehicle body by the engine mount Mt. In addition, the engine torque output from the transmission TM is transmitted to wheels (tires) WH such as drive wheels via a drive shaft. Such engine torque transmission system is configured by spring and mass, as shown in FIG. 2, and has a vibrating element with spring.

Further, a commonly used term "power train" may include not only a unit mounted on a vehicle body through an engine mount Mt, but also components other than those (such as a propeller shaft or the like, for example), but in this specification, the term "power train" is used to mean a unit mounted on a vehicle body through the engine Mt (i.e. a unit which integrally produces rolling movement as described in the followings).

Figure 3:
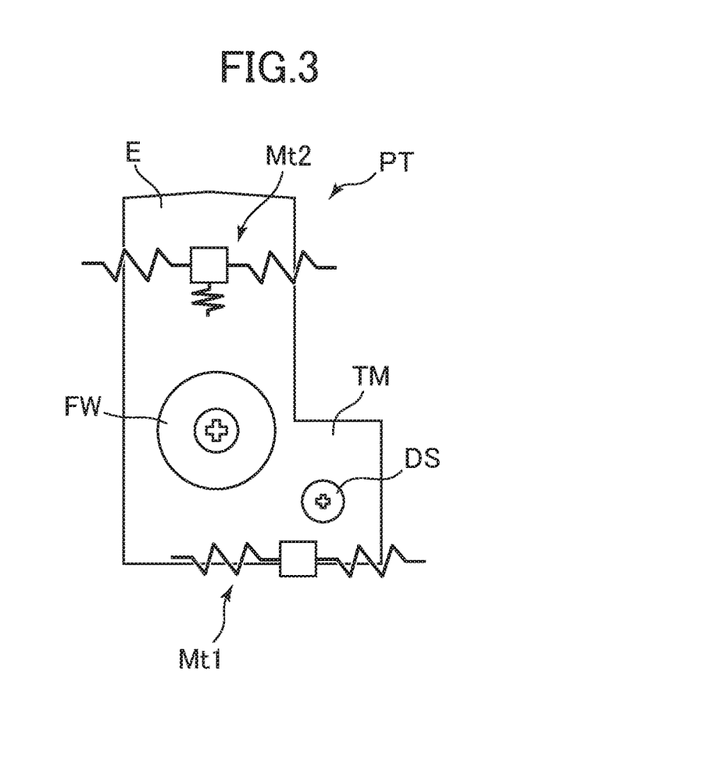
FIG. 3 is a schematic configuration diagram of a power train according to one embodiment of the present invention.

Next, with reference to FIG. 3, a configuration of a power train according to one embodiment of the present invention will be described. FIG. 3 shows a schematic configuration of a power train according to one embodiment of the present invention.

As shown in FIG. 3, the power train PT has the engine E, the flywheel FW (or possibly a torque converter) and the transmission TM, and fixed to the vehicle body through a first engine mount Mt1 and a second engine mount Mt2 which make up the above described engine mount. Specifically, the power train PT is fixed to the vehicle through a pendulum type mechanism. In this pendulum type mechanism, the power train PT is suspended at an upper portion by the second engine mount M2 so that the power train PT can be moved back and forth like a swinging movement of a pendulum (there is a principal axis of inertia (a rolling axis) which nearly coincides with the center of gravity of the power train PT about which the back and forth swinging movement is produced), and the first engine mount Mt1 is provided at a lower portion of the power train PT to control the swing movement of the pendulum (back and forth movement). The first engine mount Mt1 may also be designed such that it utilizes the swing movement of the pendulum for producing a driving force of the vehicle.

Figure 4:
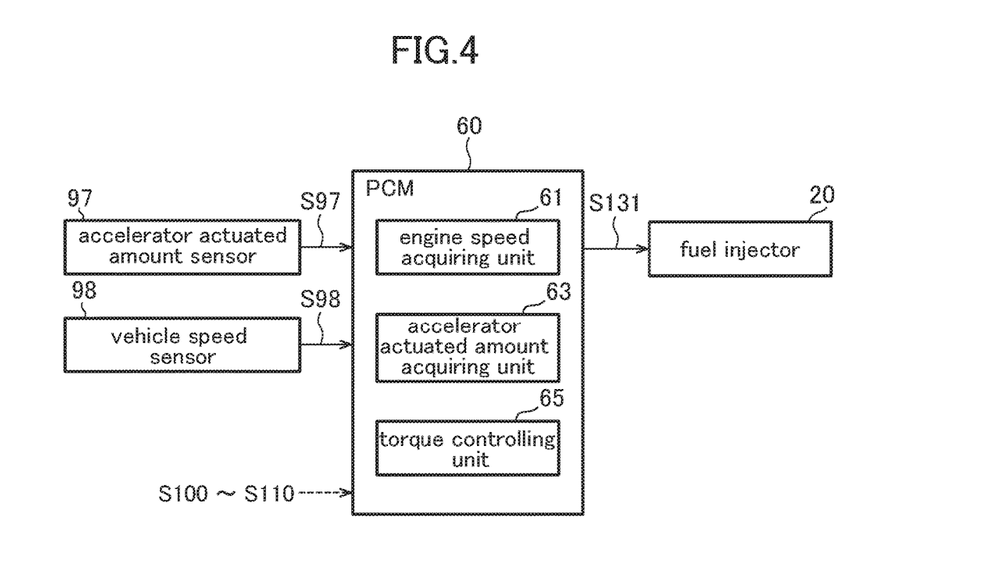
FIG. 4 is a block diagram depicting an electrical configuration of an engine control device according to one embodiment of the present invention.

Next, with reference to FIG. 4, an electrical configuration of an engine control device according to one embodiment of the present invention will be described. FIG. 4 shows a block diagram depicting an electrical configuration of an engine control device according to one embodiment of the present invention.

The PCM 60 (the engine control device) according to one embodiment of the present invention operates to output a control signal S131 to perform a control with respect to the fuel injector 20 based on detection signals S97 and S98 respectively provided from an accelerator actuated amount sensor 87 for detecting the actuated amount of the accelerator pedal (accelerator actuated amount) and a speed sensor 98 for detecting the vehicle speed, in addition to the detection signals S100 to S110 of the above described various sensors 100 to 110. Specifically, the PCM 60 comprises an engine speed acquiring unit 61 for acquiring engine speed corresponding to the detection signal S100 from the crank angle sensor 100, an accelerator actuated amount acquiring unit 63 for acquiring an accelerator actuated amount corresponding to the detection signal S97 from the accelerator actuated amount sensor 97 and a torque controlling unit 65 for controlling engine torque based on the accelerator actuated amount or the like. The torque controlling unit 65 determines a target acceleration value corresponding to the accelerator actuated amount and determines a target torque corresponding to the target acceleration value to control the fuel injector 20 so as to realize the target torque.

The above components of the PCM 60 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

[Vibration which Occurs at the Time of Acceleration]

Next, with reference to FIG. 5, vibration which occurs when a vehicle is accelerated (especially when the vehicle operation is shifted from a deceleration mode to an acceleration mode) will be described. Charts (a)-(b) in FIG. 5 each shows a schematic configuration of a power train PT similar to the one in FIG. 3, wherein chart (a) in FIG. 5 is an illustration with respect to vibration which occurs at an early stage of the acceleration, chart (b) in FIG. 5 is an illustration with respect to a vibration which occurs at a middle stage of the acceleration and chart (c) in FIG. 5 is an illustration with respect to vibration which occurs at a later stage of the acceleration.

Figure 5:
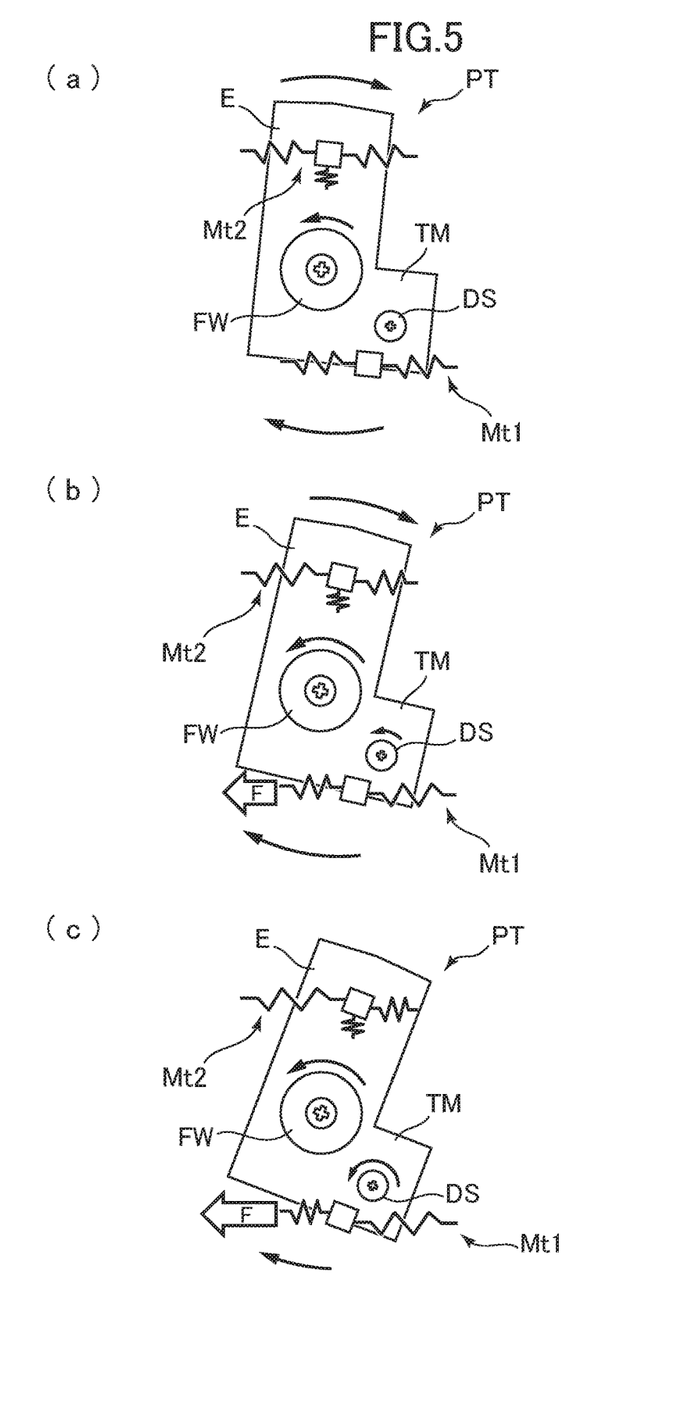
FIG. 5 is an illustrative diagram with respect to vibration which occurs when a vehicle is accelerated.

First, as shown in chart (a) in FIG. 5, at an early stage of acceleration, a so-called "lost motion" occurs between members (such as gears inside the transmission system, splines between the drive shaft DS and the wheel WH etc.) which have play of a transmission system through which the engine torque is transmitted, when the engine torque is started to increase. If the lost motion occurs furiously at this time, vibration occurs (especially, noise is generated). Further, more specifically, at the early state of acceleration, first, the crank shaft 25 is twisted by the torque applied thereto via the piston 23 under a combustion inside the combustion chamber 17, and thereafter, the lost motion of the transmission system occurs.

Next, as shown in chart (b) in FIG. 5, when the lost motion of the transmission system ends, a rolling movement is produced in the power train PT suspended from the vehicle body through the pendulum mechanism. Specifically, a force in a direction opposite to a direction of rotation of the crank shaft 25 is applied to the power train PT and a rolling movement is produced, for example, in the forward direction of the vehicle body in the case of the aforementioned front-engine, front-wheel drive type vehicle. When the rolling movement is produced in the power train PT as described above, vibration (shock) tends to be produced in the vehicle body.

Next, as shown in chart (c) in FIG. 5, when the forward rolling stroke of the rolling movement of the power train PT comes to an end (specifically, when the first engine mount M1 is completely pressed by the forward rolling stroke of the rolling movement), a force may be applied to the wheel WH via the drive shaft DS, but since the wheel WH is contacting a road surface, the drive shaft becomes twisted by the engine torque before the wheel WH starts roll. Vibration tends to occur at this point of time. Further, twisting of the drive shaft DS is not exclusively caused at the time when the aforementioned forward stroke of the rolling movement of the power train PT comes to an end, but it is also caused even during the rolling movement of the power train PT. In other words, the twisting of the drive shaft DS may also be produced together with the rolling movement of the power train PT.

In addition, when the twisting of the drive shaft DS reaches a predetermined phase (for example, when it reaches an yield point), the twisting of the drive shaft DS stops, a force is then applied from the drive shaft DS to the wheel WH, and the wheel WH starts rolling. In this case, constraint on the drive shaft DS by the wheel WH is released to allow the twisted drive shaft DS to restore its untwisted state, so that, a force generated by restoring action of the drive shaft DS is transmitted to the power train PT as a reaction force. Vibration tends to occur also at this point of time.

A series of vibration as described above occurs repeatedly if engine torque is largely increased at the time of acceleration. In other words, a repetition starting from the lost motion of the transmission system, the rolling movement of the power train PT, the twisting of the drive shaft DS, and the restoring action of the twisted drive shaft DS occurs. Generally, in order to restrict repetitive occurrence of such vibration, the engine torque is increased considerably slowly.

[Control]

Next, an engine torque control according to one embodiment of the present invention will be described.

Figure 6:
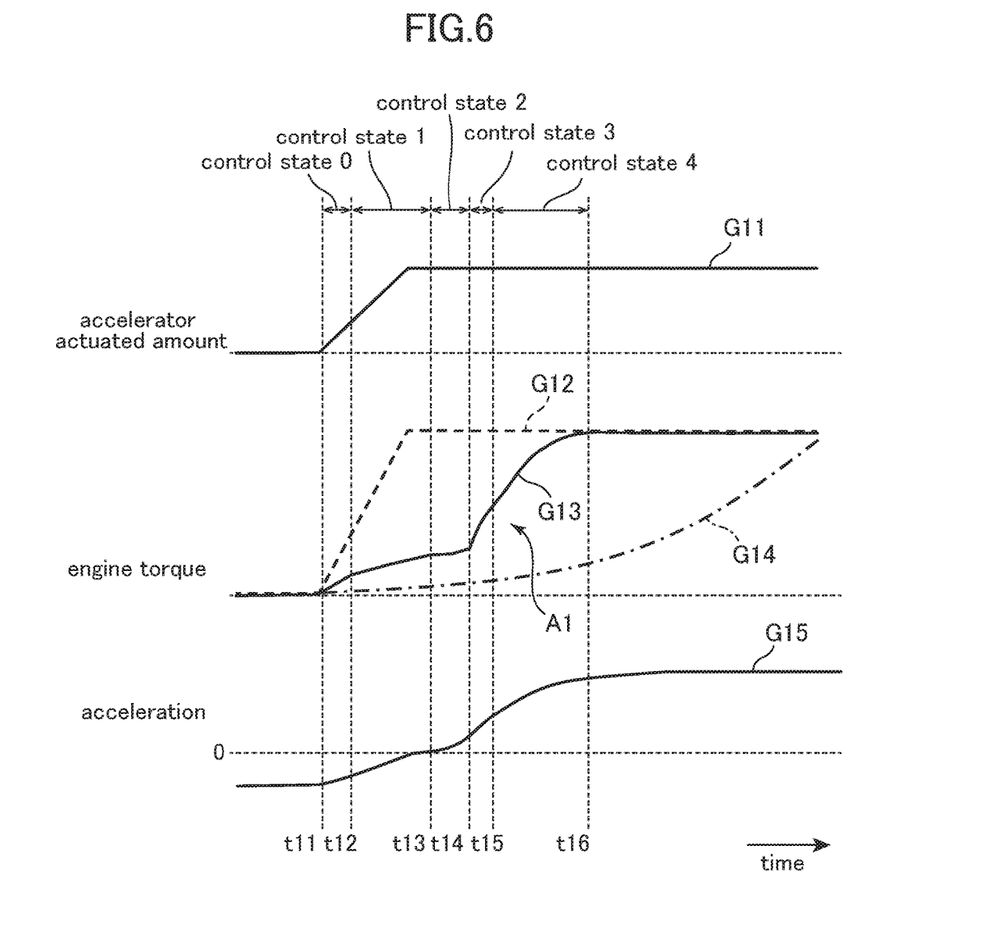
FIG. 6 is a time chart for describing a summary of an engine torque control according to one embodiment of the present invention.

First, with reference to FIG. 6, a summary of an engine torque control according to one embodiment of the present invention is described. FIG. 6 is a time chart for describing a summary of an engine torque control according to one embodiment of the present invention.

In FIG. 6, a temporal change of an accelerator actuated amount is shown by a graph G11, a temporal change of a required torque corresponding to the accelerator actuated amount by a graph G12, a target torque determined in this embodiment by a graph G13, a target torque in a comparative example by a graph G14, and a temporal change of acceleration when the target torque according to this embodiment is applied by a graph G15.

Here, description will be made on a case where an accelerator pedal is depressed (i.e. an accelerator actuated amount is increased) at time t11 and a vehicle deceleration mode is converted to an acceleration mode. In addition, it should be understood that the required torque corresponding to the accelerator actuated amount shown in the graph G12 is a torque which is to be applied in order to realize the target acceleration corresponding to the accelerator actuated amount (hereinafter appropriately referred as a "basic target torque"). The target torque shown in the graph G13 is a torque which is a modified basic target torque (hereinafter appropriately referred as a "target torque for vibration suppression") in view of suppressing vibration at the time of acceleration while maintaining an acceleration performance, in accordance with this embodiment. In addition, the target torque shown in the graph G14 is a target torque of a comparative example determined by giving priority to suppression of vibration at the time of acceleration, at the expense of improving acceleration performance.

As shown in the graph G13, in this embodiment, in order to suppress vibration which occurs when the vehicle is accelerated, the torque control device 65 of the PCM 60, in principle, operates to control to limit increase in the engine torque by making an actual increase rate of the engine torque smaller than the basic target torque (the required torque) shown in the graph G12. In addition, in this embodiment, while the torque control device 65 operates to limit increase in the engine torque as described above, it also operates to make the actual increase rate of the engine torque larger than the target torque in the comparative example shown in the graph G14 so as to maintain the acceleration performance of the vehicle (refer to the graph G15).

Particularly, in this embodiment, the torque control device 65 takes into consideration (refer to FIG. 2) a vibration characteristics of a vehicle transmission system or a spring and mass system, for limiting increase in the engine torque taking reference to the vibration characteristics so as to appropriately suppress vibration at the time of acceleration, but at the same time, operates not to limit increase in the engine torque more than necessary so as to maintain acceleration performance. Specifically, the torque control device 65 operates to control the increase rate of the engine torque to handle each of the above described lost motion of the transmission system, the rolling movement of the power train PT, the twisting of the drive shaft DS, and the restoring action of the twisted drive shaft DS, which are governing factors of vibration at the time of acceleration. In this case, in this embodiment, as shown in FIG. 6, the torque control device 65 operates to define five control states 0 to 4, and operates to control the increase rate of the engine torque individually at each control state (refer to the arrow A1). Further, it is to be noted that the torque control at the control state 0 to 2 corresponds to "a first torque control", and the torque control at the control state 3 to 4 corresponds to "a second torque control".

First, at the control state 0 immediately after start of acceleration (time t11 from time t12), the torque control device 65 operates to control for limiting increase in engine torque so as to suppress vibration which occur at the time of the lost motion of the transmission system to which engine torque is transmitted. With this operation, the lost motion of the transmission system occurs slowly so that major vibration (especially noise) may not be produced at the time of the lost motion.

Subsequently, the torque control device 65 at the control state 1 (time t12 to time t13) operates to control for limiting increase in the engine torque so as to provide a starting condition (in other words, an initial condition) of the rolling movement of the power train PT, specifically, to control initial speed of the rolling movement of the power train PT. With this operation, the initial speed of the rolling movement of the power train PT is limited to a predetermined speed or lower so as to improve controllability of a control for suppressing the rolling movement of the power train PT which is to be executed after this control.

Thereafter, the torque control device 65 functions, during the control state 2 (time t13 to time t14), to control for limiting increase in the engine torque so as to suppress the rolling movement of the power train PT while the rolling movement is being produced. With this function, rolling speed of the power train PT can be controlled, or in other words, the rolling movement of the power train PT is made to occur at a low speed to thereby have the first engine mount Mt1 quickly damped so as to reduce the rolling movement of the power train PT.

Further, since the engine mount Mt is formed by a material softer than that of the drive shaft DS, it is possible to appropriately handle the twisting of the drive shaft DS by controlling increase in the engine torque so as to suppress the rolling movement of the power train as described above (the control state 2). In other words, by performing a control for suppressing the rolling movement of the power train PT, the drive shaft can be twisted at a slower rate, and thus, vibration caused by twisting of the drive shaft can be suppressed.

Then, the torque control device 65 functions, during the control state 3 (time t14 to time t15), to control for cancelling the function of limiting increase in the engine torque described above, to thereby have the engine torque increased so as to override reaction force generated in the drive shaft DS when the drive shaft DS which has been twisted by the torque transmitted from the engine E restores its untwisted condition. Specifically, the torque control device 65 operates to control to increase the engine torque in order to generate, in the power train PT, forward force which is at least larger than the force transmitted to the power train PT when the twisted drive shaft DS restores its untwisted condition (a force to push the power train PT backward). For example, the torque control device 65 operates to increase the engine torque by an increase rate comparable with that of the basic target torque (the required torque), or an increase rate larger than that of the basic target torque. With this operation, the effect of the reaction force of the twisted drive shaft DS can be reduced. Specifically, the effect on the power train PT being pushed backward by the reaction force of the drive shaft DS can be suppressed, so that it is possible to maintain a condition in which a force is applied to the power train PT toward a driving direction. With this control, it becomes possible to suppress a tendency of the power train PT being pushed backward by the reaction force of the drive shaft DS so that another cycle of rolling movement or the like of the power train PT will not be produced.

Subsequently, the torque control device 65 functions, in the control state 4 (time t15 to time t16), to conduct a control for increasing the engine torque so that the engine torque is allowed to reach the basic target torque which is the required torque. For example, the torque control device 65 performs a control for increasing the engine torque by an increase rate comparable with that of the basic target torque, or an increase rate larger than that of the basic target torque. In addition, the torque control device 65 functions to lower the increase rate of the engine torque as the actual engine torque approaches the basic target torque. With this control, the engine torque reaches the basic target torque corresponding to the accelerator actuated amount quickly without any uncomfortable feeling to thereby improve accelerator performance.

Further, the torque control device 65 functions to switch the torque control for each of the aforementioned control states 0 to 4 depending on a change of engine speed. Specifically, the torque control device 65 operates to determine at least one or more of angular speed, angular acceleration and angular jerk (i.e. rate of change of angular acceleration) of the crank shaft 25 based on the detection signal S100 input from the crank angle sensor 100, and based on such at least one or more of the angular speed, angular acceleration and angular jerk, functions to switch the control states 0 to 4 for changing the increase rate of the engine torque. In this case, the torque control device 65 operates to determine the lost motion of the transmission system, the rolling movement of the power train PT, and restoring action of the twisted drive shaft DS, which are occurring in the engine system, based on the at least one or more of the angular speed, angular acceleration and angular jerk (particularly, determines timing of generation and/or timing of ending of these phenomena) for switching the control states 0 to 4 in accordance with the determined results.

In addition, the torque control device 65 is operable to terminate the torque control corresponding to any of the control states 0 to 4 when a predetermined time has passed (for example, a time of around 100 to 400 ms) after the accelerator actuated amount is started to increase, even if any of the control states 0 to 4 is in the middle of execution to execute a normal torque control corresponding to the basic target torque. Basically, the torque control at any of the control states 0 to 4 is set so that it is completed in a predetermined time after the accelerator actuated amount is started to increase, or in other words, it is set so that vibration at the time of acceleration may settle in a predetermined time by executing the torque control at any of the control states 0 to 4. However, depending on circumstances, since there may be a case where reduction of vibration is difficult even if the torque control at any of the control states 0 to 4 is executed, and in that case, in view of maintaining acceleration performance, the torque control according to any of the control states 0 to 4 is terminated in midstream to execute the normal torque control corresponding to the basic target torque.

Figure 7:
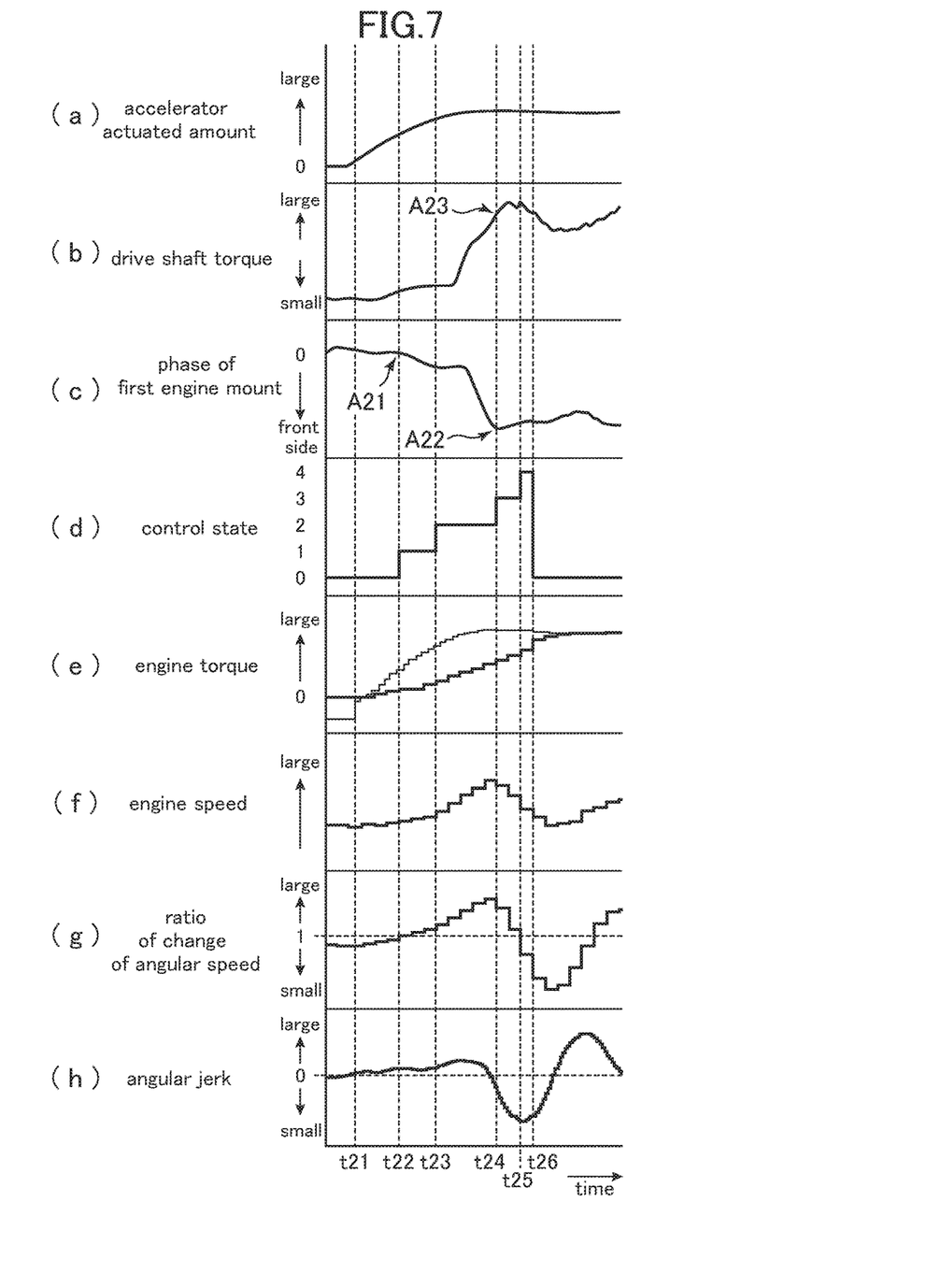
FIG. 7 is a time chart depicting a temporal change of various parameters acquired when an engine torque control according to one embodiment of the present invention is executed.

Next, with reference to FIG. 7, an engine torque control according to one embodiment of the present invention will be more specifically described. FIG. 7 is an example of a time chart depicting a temporal change of various parameters acquired when an engine torque control according to one embodiment of the present invention is executed.

Chart (a) in FIG. 7 shows a temporal change of an accelerator actuated amount, chart (b) in FIG. 7 shows a temporal change of torque of the drive shaft DS, chart (c) in FIG. 7 shows a temporal change of a phase in a rolling direction (forward-and-backward direction in the case of the aforementioned front-engine, front-wheel drive type vehicle) of the first engine mount Mt1 (in other words, displacement in a front-back direction), chart (d) in FIG. 7 shows a temporal transition of control states, chart (e) in FIG. 7 shows a temporal change of the engine torque, chart (f) in FIG. 7 shows a temporal change of engine speed, chart (g) in FIG. 7 shows a temporal change of the ratio of change of the angular speed at different timings which is determined based on values taken at successional timings along a time axis with respect to the angular speed of the crank shaft 25, and chart (h) in FIG. 7 shows a temporal change of angular jerk (i.e. rate of change of angular acceleration) of the crank shaft 25.

Here, description will be made on a case where, as shown in chart (a) in FIG. 7, the accelerator pedal is depressed at a timing t21 to switch a vehicle in a decelerating mode to an accelerating mode. Torque of the drive shaft DS shown in chart (b) in FIG. 7 is measured by a strain gage or the like attached to the drive shaft DS, for example. The first engine mount Mt1 has an operating phase as shown in chart (c) in FIG. 7 wherein the character "0" designates a reference position, and the value of the phase becomes smaller than "0" as the first engine mount Mt1 is moved forward. In chart (e) in FIG. 7, a temporal change of the basic target torque (the required torque) is shown by a thin line and a temporal change of the target torque for vibration suppression control according to this embodiment is shown by a thick line. Engine speed shown in chart (f) in FIG. 7 is a value determined by the PCM 60 from the detection signal S100 of the crank angle sensor 100, and the ratio of change of the angular speed and angular jerk respectively shown in charts (g) and (h) in FIG. 7 are values determined by the PCM 60 from the engine speed. In this case, the PCM 60 operates to divide the angular speed determined based on the detection signal S100 presently received from the crank angle sensor 100, by the angular speed determined based on a detection signal S100 received at a preceding timing from the crank angle sensor 100 to acquire a value defining a ratio of change of angular speed. The ratio of change of the angular speed becomes a parameter which represents an angular acceleration. While the angular acceleration is a parameter which shows degree of change of the angular speed by an absolute value, the ratio of change of the angular speed is a parameter which represents a relative value of values acquired at two successional timings, for the angular speed acquired as a discrete value.

First, when the accelerator actuated amount is started to increase at the timing t 21, the torque controlling unit 65 of the PCM 60 functions, at the control state 0, to conduct a control for limiting an increase in the engine torque so as to suppress vibration which would occur at the time of lost motion of the transmission system to which engine torque is transmitted. Specifically, the torque controlling unit 65 functions, at the control state 0, to apply a minimum necessary engine torque so that the lost motion is completed in a rapid manner while suppressing vibration at the time of lost motion. For example, the torque controlling unit 65 operates to carry out a control wherein an engine torque around zero (N) in about three to four combustion cycles. The torque around zero (N) corresponds to a torque generated in the fly wheel FW, and the actual force transmitted from the engine 23 to the crank shaft 25 in the engine E is about 100(N).

Subsequently, after the lost motion of the transmission system is completed, the rolling movement of the power train PT will begin. When the rolling movement of the power train PT begins as such, as shown in an arrow A21 in chart (c) in FIG. 7, the phase of the first engine mount Mt1 shifts forward from the reference position ("0"), or the phase of the first engine mount Mt1 switches from an upper position to a lower position. In this case, when the rolling movement of the power train PT begins, the angular speed of the crank shaft 25 is started to increase. Therefore, the torque controlling unit 65 operates to determine that the rolling movement of the power train PT has started at the timing when the angular speed of the crank shaft 25 is started to increase to switch from the control state 0 to the control state 1. Specifically, the torque controlling unit 65 operates to switch from the control state 0 to the control state 1 when the value of angular jerk is positive and the ratio of change of the angular speed exceeds a first predetermined value which is 1 or more (for example, 1.01) (timing t22) to start a control for limiting an increase in the engine torque so as to control initial speed of the rolling movement of the power train PT. In this case, the torque controlling unit 65 functions, at the control state 1, to have the engine torque increased with a relatively small increase rate so that the initial speed of the rolling movement of the power train PT becomes a predetermined speed or lower (the increase rate of the engine torque may be determined in advance by adaptation or the like). In addition, a predetermined speed applied to the initial speed of the rolling movement is determined from a point of view that the rolling movement which may cause little vibration (shock) is produced by the power train PT. Basically, the torque controlling unit 65 operates to make the increase rate of the engine torque at the control state 1 smaller than that of the engine torque at the control state 0 described in the above.

Subsequently, the torque controlling unit 65 operates to switch from the control state 1 to the control state 2 to conduct a control for directly suppressing the rolling movement at a predetermined timing while the rolling movement of the power train PT is occurring. Specifically, the torque controlling unit 65 operates to switch the control state from the control state 1 to the control state 2 when the value of angular jerk is positive and ratio of change of the angular speed exceeds a second predetermined value which is larger than the above described first predetermined value (for example, 1.02) (timing t23) to start a control for limiting increase in the engine torque so as to suppress the rolling movement of the power train PT. In this case, the torque controlling unit 65 functions, at the control state 2, to have the engine torque increased with a relatively small increase rate such that the rolling movement by the power train PT is produced at low speed and that the first engine mount Mt1 is quickly damped to reduce the rolling movement of the power train PT (the increase rate of the engine torque may be determined in advance by adaptation or the like). Basically, the torque controlling unit 65 operates to make the increase rate of the engine torque at the control state 2 smaller than that of the engine torque at the control state 1 described above.

Thereafter, when the rolling movement of the power train PT ends, the twisted drive shaft DS then restores its original state, producing a reaction force. In this case, it is noted that, at a timing shown by the arrow A22 in chart (c) in FIG. 7, the movement of the first engine mount Mt1 in the forward direction ends and the rolling movement of the power train PT is terminated. In addition, it is noted that, at this timing, as shown in the arrow A23 in chart (b) in FIG. 7, the amount of torque applied to the drive shaft DS is large so that the drive shaft DS is largely twisted. It is assumed that, immediately after this, the drive shaft DS restores its original state, producing a reaction force is generated. As described above, at the timing when the rolling movement of the power train PT is terminated and a reaction force of the drive shaft DS is likely to be generated, the angular speed of the crank shaft 25 which has been increasing up to this timing tends to decrease (in other words, the angular jerk is changed from a positive value to a negative value).

Therefore, the torque controlling unit 65 functions to determine as that, at the timing when the angular speed of the crank shaft 25 which has been increasing becomes to decrease, the rolling movement of the power train PT is terminated producing a reaction force of the drive shaft DS thereafter, to shift from the control state 2 to the control state 3. Specifically, the torque controlling unit 65 operates to shift the control from the control state 2 to the control state 3 when the angular jerk becomes a predetermined value or lower (0 or a negative value around 0) and the ratio of change of the angular speed is started to decrease (time t24), to thereby start a control for increasing the engine torque in an amount sufficient to override the reaction force generated when the drive shaft DS restores its original untwisted state. In this case, the torque controlling unit 65, at the control state 3, operates to increase the engine torque with a relatively large increase rate so that the power train PT is prevented from being pushed backward by the reaction force of the drive shaft DS to keep a condition in which a force is applied to the power train PT toward a driving direction (the increase rate of the engine torque may be determined in advance by adaptation or the like). For example, the torque controlling unit 65 operates to increase the engine torque at an increase rate comparable with that of the basic target torque (the required torque), or an increase rate larger than that of the basic target torque. Basically, the torque controlling unit 65 operates to make the increase rate of the engine torque at the control state 3 larger than that of the engine torque at the control state 2 described in the above.

Subsequently, the torque controlling unit 65 functions to change the control from the control state 3 described above to the control state 4 at a timing when the effect of reaction force generated when the twisted drive shaft DS restores its untwisted state is suppressed. Specifically, the torque controlling unit 65 operates to determine as that, when ratio of change of the angular speed is approximately 1 and the angular jerk is started to increase (time t25), the effect of the reaction force of the drive shaft DS is suppressed, to shift the control from the control state 3 to the control state 4 so as to start a control for increasing the engine torque so that the basic target torque (the required torque) is reached. For example, the torque control device 65 operates to increase the engine torque by an increase rate comparable with that of the basic target torque (the required torque), or an increase rate larger than that of the basic target torque. In one example, the torque controlling unit 65 functions to make the increase rate of the engine torque at the control state 4 larger than that of the engine torque at the control state 3 described above.

Thereafter, at the timing t26, when a predetermined time has passed after the accelerator actuated amount is started to increase (in other words, after the control according to this embodiment for suppressing vibration at the time of acceleration is started), the torque controlling unit 65 functions to terminate the control under the control state 4 described above to then execute the normal torque control corresponding to the basic target torque.

Further, when the control for increasing the engine torque under the control states 3 and 4 is performed, the increase rate of the engine torque may preferably be controlled so that the angular jerk generated under a vehicle acceleration becomes a predetermined limiting value or lower. The limiting value of angular jerk may be set in accordance with a transmission gear stage and/or the accelerator actuated amount of a vehicle from the viewpoint of improving feeling of acceleration.

[Flowchart]

Next, with reference to FIGS. 8 and 9, a specific control process executed in an engine torque control according to one embodiment of the present invention will be described.

Figure 8:
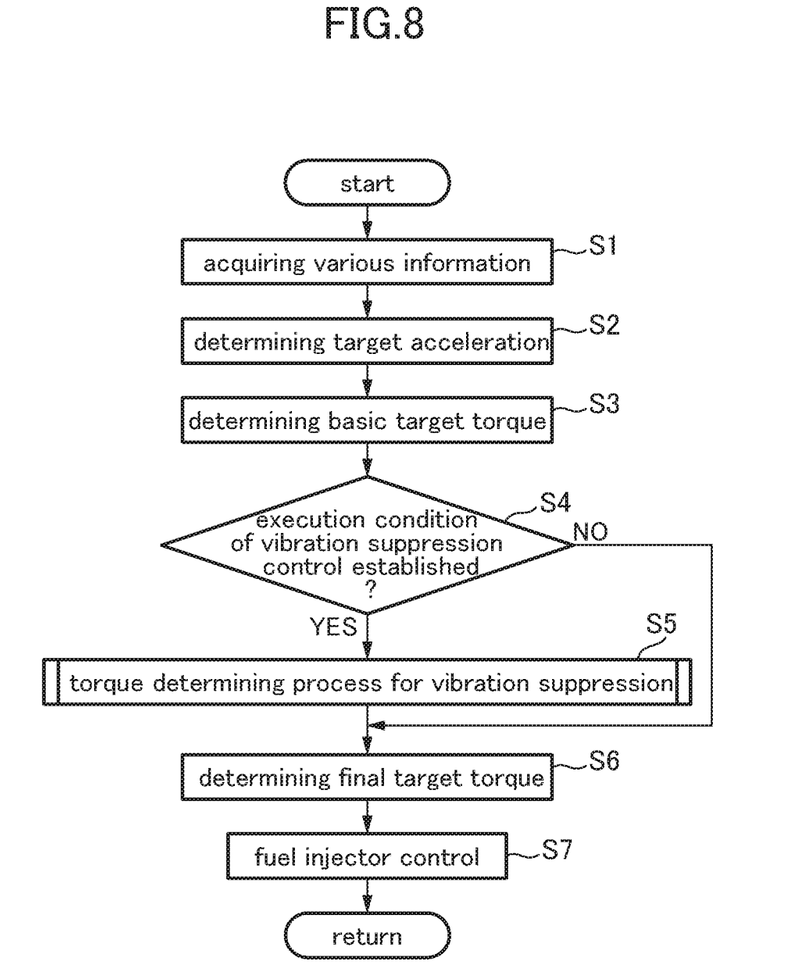
FIG. 8 is a flowchart depicting an entire process of an engine torque control according to one embodiment of the present invention.

FIG. 8 is a flowchart depicting an entire process of an engine torque control according to one embodiment of the present invention. The process flow is activated when an ignition switch of a vehicle is turned on to apply power to the control device (PCM) of an engine, and is repeatedly executed with a given cycle period.

First, in step S1, the PCM 60 operates to acquire information on the driving state of a vehicle. Specifically, the PCM 60 operates to acquire, as the driving state, detection signals S97, S98, S100 to 110 or the like provided by the aforementioned various sensors 97, 98, 100 and 110, including the accelerator actuated amount detected by the accelerator actuated amount sensor 97, the vehicle speed detected by the vehicle speed sensor 98, the crank angle detected by the crank angle sensor 100, and a gear stage currently set in a transmission of the vehicle.

Subsequently, in step S2, the PCM 60 operates to set a target acceleration based on the driving state of the vehicle including the accelerator pedal operation or the like, acquired in the step S1. Specifically, the torque controlling unit 65 of the PCM 60 operates to select, from a plurality of acceleration characteristic maps defined with respect to various vehicle speeds and various transmission gear stages (the maps are created in advance and stored in a memory or the like), one acceleration characteristic map corresponding to a current vehicle speed and a current transmission gear stage, and determine the target acceleration corresponding to a current accelerator actuated amount, with reference to the selected acceleration characteristic map.

Subsequently, in step S3, the torque controlling unit 65 of the PCM 60 operates to determine the basic target torque of the engine E for realizing the target acceleration determined in the step S2. In this case, torque controlling unit 65 functions to determine the basic target torque within a torque range which can be produced by the engine E, based on current vehicle speed, transmission gear stage, road grade, road surface friction (μ), etc.

Subsequently, in step S4, the torque controlling unit 65 functions to determine whether a condition for executing an engine torque control (hereinafter referred as a "vibration suppression control") for suppressing vibration at the time of acceleration according to this embodiment is met. Specifically, the torque controlling unit 65 determines whether the condition for executing the vibration suppression control is met when the accelerator pedal is depressed to have the vehicle operation shifted from a deceleration to an acceleration (step S4: Yes). In this case where the answer is YES, the process proceeds to step S5, and the torque controlling unit 65 operates to determine a new target torque with a basic target torque modified from the one determined in the step S3 (hereinafter, the target torque is referred as a "torque for vibration suppression," and a process for determining the torque for vibration suppression is referred as a "torque determining process for vibration suppression") to execute the vibration suppression control. Then, the process proceeds to step S6. On the other hand, when the condition for executing the vibration suppression control is not met (step S4: No), the step S5 is not executed and the process proceeds to step S6.

In step S6, the torque controlling unit 65 determines a final target torque to be finally produced by the engine E. Specifically, the torque controlling unit 65 adopts the torque for vibration suppression as determined in the step S5 as the final target torque if the step S5 has been executed, and if the step S5 has not been executed, the basic target torque determined in the step S4 is adopted as the final target torque.

Subsequently, in step S7, the torque controlling unit 65 functions to control the fuel infection valve 20 so that the final target torque determined in the step S6 is produced by the engine E. Specifically, the torque controlling unit 65 first operates to, based on the final target torque and the engine speed, determines a required fuel injection amount to be injected from the fuel injector 20, and then, based on the required injection amount and the engine speed, decides a fuel injection pattern and a fuel pressure. Then, the torque controlling unit 65 operates to control the fuel injector 20 based on the injection pattern and the fuel pressure set as described above.

Further, a limiting value to limit the angular jerk generated in the vehicle may preferably be set in accordance with the accelerator actuated amount and/or the rate of change of the accelerator actuated amount and/or a transmission gear stage to limit the target acceleration so that the angular jerk possibly generated in the vehicle does not exceed the limiting value. Alternatively, the basic target torque or the final target torque may be limited so that the angular jerk generated in the vehicle does not exceed the limiting value.

Next, with reference to FIG. 9, the torque determining process for vibration suppression executed in the step S5 in FIG. 8 will be described. FIG. 9 is a flowchart depicting a torque determining process for vibration suppression according to one embodiment of the present invention. This process flow can also be repeatedly executed by the PCM (specifically, by the torque controlling unit 65).

First, in step S501, the torque controlling unit 65 functions to determine whether a predetermined time is passed after the accelerator actuated amount is started to increase (in other words, after the vibration suppression control is started). For example, the predetermined time is determined as a time around 100 to 400 ms. When the predetermined time is passed (step S501: Yes), the torque determining process for vibration suppression is terminated, and when the predetermined time is not passed (step S501: No), the process proceeds to step S502.

In step S502, the torque controlling unit 65 operates to determine a ratio of change of the angular speed which is determined based on values of the angular speed taken at successional timings along a time axis with respect to the angular speed of the crank shaft 25, and angular jerk of the crank shaft 25, based on the detection signal S100 input from the crank angle sensor 100.

Subsequently, in step S503, the torque controlling unit 65 operates to determine whether the condition to execute the torque control at a control state 0 (a state 0 execution condition) is met. The state 0 execution condition is a condition where the ratio of change of the angular speed is less than the first predetermined value which is 1 or more (for example, 1.01), or alternatively, the angular jerk is of a negative value. In addition to such condition of the ratio of change of the angular speed and the angular jerk, the state 0 execution condition may additionally include a further condition that the torque control under the control states 1 to 4 is currently not executed. By doing so, when the control state 0 is being executed, the torque control at the control state 0 may be continued until a state 1 execution condition described in the following is met.

When the state 0 execution condition is met (step S503: Yes), the process proceeds to step S504, and the torque controlling unit 65 determines a torque for vibration suppression (a torque for state 0) to be applied for the torque control at the control state 0. Specifically, the torque controlling unit 65 determines the torque for state 0 which limits the increase rate of the engine torque so as to suppress vibration which may occur at the time of lost motion of the transmission system to which engine torque is transmitted. For example, the torque controlling unit 65 operates to set the torque around zero (N) as previously described as the torque for state 0. In addition, the torque controlling unit 65 operates to change the torque for state 0 in accordance with the transmission gear stage which is currently selected. In this case, the torque controlling unit 65 functions to make, in a low gear stage (2nd and/or 3rd stage etc.), the torque for state 0 smaller than that for a high gear stage (4th and/or 5th stage etc.).

On the other hand, when the state 0 execution condition is not met (step S503: No), the process proceeds to step S505, and the torque controlling unit 65 operates to determine whether a condition to execute a torque control under a control state 1 (a state 1 execution condition) is met. The state 1 execution condition is a condition where the ratio of change of the angular speed is more than the first predetermined value which is 1 or more (for example, 1.01), and the angular jerk is of a positive value. In addition to such condition of ratio of change of the angular speed and the angular jerk, a further condition whether the torque control under the control states 0 or 1 is currently being executed (in other words, a condition that the torque control at the control states 2 to 4 is currently not executed) may be added to the state 1 execution condition. By doing so, when the control state 0 is being executed, the control state is shifted from the control state 0 to the control state 1 when the above described condition of ratio of the change of the angular speed and angular jerk is met and when the control state 1 is adopted, the torque control under the control state 1 may be continued until a state 2 execution condition described in the following is established.

When the state 1 execution condition is established (step S505: Yes), the process proceeds to step S505, and the torque controlling unit 65 operates to determine that a torque for vibration suppression (a torque for state 1) is to be applied for the torque control at the control state 1. Specifically, the torque controlling unit 65 operates to adopt the torque for state 1 which limits the increase rate of the engine torque so as to control the initial speed of the rolling movement of the power train PT. Particularly, the torque controlling unit 65 operates to set the torque for state 1 by which the initial speed of the rolling movement of the power train PT is at a predetermined speed or lower. In addition, the torque controlling unit 65 operates to change the torque for state 1 in accordance with the transmission gear stage currently selected. Also in this case, the torque controlling unit 65 functions to make, for a low transmission gear stage, the torque for state 1 smaller than that for a high transmission gear stage. In addition, the torque controlling unit 65 operates to set the torque for state 1 so that the increase rate of the engine torque under the control state 1 becomes smaller than that of the engine torque under the control state 0.

On the other hand, when the state 1 execution condition is not met (step S505: No), the process proceeds to step S507, and the torque controlling unit 65 operates to determine whether a condition to execute a torque control under a control state 2 (a state 2 execution condition) is met. The state 2 execution condition is a condition where the ratio of change of the angular speed is more than a second predetermined value (for example, 1.02) which is larger than the first predetermined value, and the angular jerk is of a positive value. In addition to such condition of ratio of change of the angular speed and the angular jerk, the state 2 execution condition may further include a condition whether the torque control under the control states 1 or 2 is currently executed (in other words, a condition that the torque control at the control states 0, 1 and 3 is currently not executed). By doing so, when the control state 1 is executed, the control state is shifted from the control state 1 to the control state 2 when the above described condition of ratio of change of the angular speed and the angular jerk is established, and when the control state 2 is selected, the torque control under the control state 2 may be continued until a state 3 execution condition described in the following is established.

When the state 2 execution condition is met (step S507: Yes), the process proceeds to step S508, and the torque controlling unit 65 determines a torque for vibration suppression (a torque for state 2) which is to be applied for the torque control under the control state 2. Specifically, the torque controlling unit 65 operates to determine a torque for state 2 which limits the increase rate of the engine torque for suppressing the rolling movement of the power train PT. Particularly, the torque controlling unit 65 operates to determine the torque for state 2 such that the rolling movement at a predetermined speed or lower may be produced by the power train PT. In addition, the torque controlling unit 65 operates to change the torque for state 2 in accordance with the transmission gear stage currently selected. Also in this case, the torque controlling unit 65 functions to make, for a low transmission gear stage, the torque for state 2 smaller than that for a high transmission gear stage. In addition, the torque controlling unit 65 operates to set the torque for state 2 so that the increase rate of the engine torque at the control state 2 becomes smaller than that of the engine torque at the control state 1.

On the other hand, when the state 2 execution condition is not established (step S507: No), the process proceeds to step S509, and the torque controlling unit 65 operates to determine whether a condition to execute a torque control under a control state 3 (a state 3 execution condition) is met. The state 3 execution condition is a condition where the ratio of change of the angular speed is decreased, and the angular jerk is at a predetermined value or lower (0 or a negative value around 0). In addition to such condition of the ratio of change of the angular speed and the angular jerk, the state 3 execution condition may further include a condition whether the torque control under the control states 2 or 3 is currently executed (in other words, a condition that the torque control under the control states 0, 1 and 4 is currently not executed). By doing so, when the control state 2 is being executed, the control state is shifted from the control state 2 to the control state 3 when the above described condition of ratio of change of the angular speed and the angular jerk is established, and once the control state 3 is adopted the torque control under the control state 3 may be continued until a state 4 execution condition described in the following is established.

When the state 3 execution condition is established (step S509: Yes), the process proceeds to step S510, and the torque controlling unit 65 operates to determine a torque for vibration suppression (a torque for state 3) which is to be applied for the torque control at the control state 3. Specifically, the torque controlling unit 65 operates to set a torque for state 3 which increases the engine torque so that a reaction force generated when the drive shaft DS restores its untwisted state is overridden. In this case, the torque controlling unit 65 operates to set the torque for state 3 so that the power train PT is prevented from being pushed backward by the reaction force of the drive shaft DS to keep a condition in which a force is applied to the power train PT toward a driving direction. In addition, the torque controlling unit 65 operates to change the torque for state 3 in accordance with the transmission gear stage currently selected. Also in this case, the torque controlling unit 65 functions to make, for a low transmission gear stage, the torque for state 3 smaller than that for a high transmission gear stage. In addition, the torque controlling unit 65 operates to set the torque for state 3 so that the increase rate of the engine torque under the control state 3 becomes larger than that of the engine torque under the control state 2. For example, the torque controlling unit 65 operates to set the torque for state 3 so that the increase rate of the engine torque under the control state 3 becomes the increase rate of the basic target torque or more.

On the other hand, when the state 3 execution condition is not met (step S509: No), the process proceeds to step S511, and the torque controlling unit 65 operates to determine whether a condition to execute a torque control under a control state 4 (a state 4 execution condition) is met. The state 4 execution condition corresponds to a condition for determining whether occurrence of vibration has been reduced, wherein the ratio of change of the angular speed is nearly 1, and the angular jerk is being increased. In addition to such condition of ratio of change of the angular speed and the angular jerk, the state 4 execution condition may additionally include a further condition whether the torque control at the control states 3 or 4 is currently executed (in other words, a condition that the torque control under control states 0 to 2 is currently not executed). By doing so, when the control state 3 is being executed, the control state is shifted from the control state 3 to the control state 4 when the above described condition of ratio of change of the angular speed and the angular jerk is established, and when the control state 4 is once adopted, the torque control under the control state 4 can be continued until a predetermined time passes after the accelerator actuated amount is started to increase.

When the state 4 execution condition is established (step S511: Yes), the process proceeds to step S512, and the torque controlling unit 65 operates to determine a torque for vibration suppression (a torque for state 4) which is to be applied for the torque control under the control state 4. Specifically, the torque controlling unit 65 determines a torque for state 4 which increases the engine torque so that it reaches the basic target torque. Also in this case, the torque controlling unit 65 operates to change the torque for state 4 in accordance with the transmission gear stage currently selected. In other words, the torque controlling unit 65 functions, for a low transmission gear stage, make the torque for state 4 smaller than that for a high transmission gear stage. In addition, the torque controlling unit 65 operates to set the torque for state 4 so that the increase rate of the engine torque under the control state 4 becomes larger than that of the engine torque under the control state 3. For example, the torque controlling unit 65 operates to set the torque for state 4 so that the increase rate of the engine torque under the control state 4 becomes equal to or higher than the increase rate of the basic target torque.

On the other hand, when the state 4 execution condition is not met (step S511: No), the torque determining process for vibration suppression is terminated.

Figure 9:
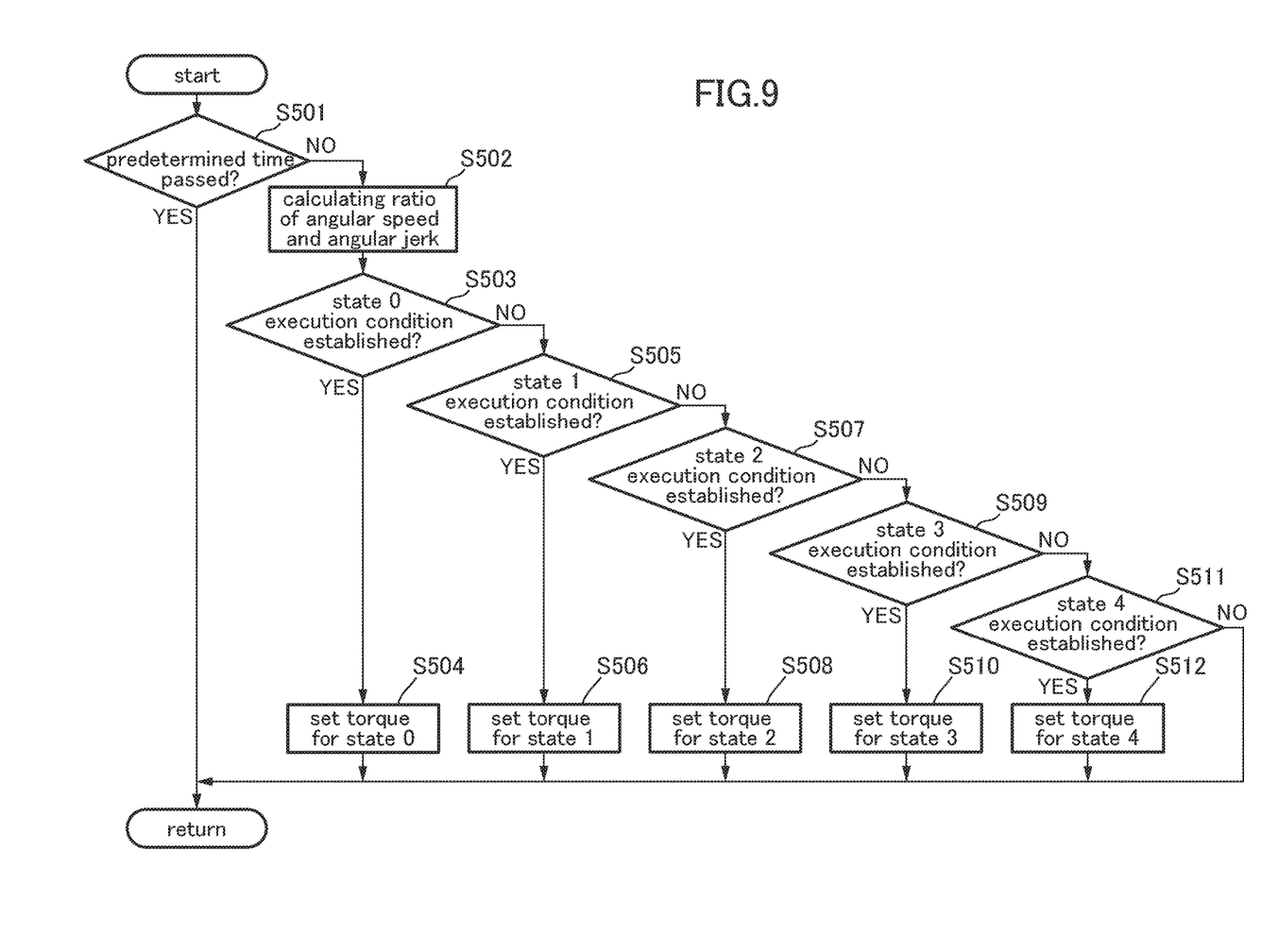
FIG. 9 is a flowchart depicting a torque determining process for vibration restriction according to one embodiment of the present invention.

Further, experiments and/or simulations may be performed to determine optimal torques for state 1 to state 4 in advance so that the torque values for states 1 to 4 determined as described above may be set respectively in a torque determining process for vibration suppression of FIG. 9. Particularly, the torque values for states 1 to 4 to be applied for every transmission gear stages may be determined respectively in advance. In addition, not only for transmission gear stages, but also the torque values for states 1 to 4 corresponding to vehicle speed may be determined in advance.

[Operational Effect]

Next, an operational effect of the engine control device according to one embodiment of the present invention will be described.

According to the present invention, based on a change of the engine speed (at least one or more of angular speed, angular acceleration and angular jerk of the crank shaft 25), the lost motion of the transmission system, the rolling movement of the power train PT and the restoring action of the twisted drive shaft DS which are occurring in the engine system are determined to limit increase in the engine torque individually in accordance with the determined results, so that it is possible to appropriately suppress vibrations which may be caused by such phenomena respectively. In this case, in this embodiment, since the torque is limited corresponding to phenomena which become occurrence factors of vibration, increase in the engine torque is not limited more than necessary compared with the comparative example which limits torque without considering the phenomena which become the occurrence factors of vibration, and thus, limiting of the torque may be relaxed as a whole, or in other words, the increase rate of the engine torque at the time of acceleration may be increased to improve acceleration performance (acceleration response) of a vehicle.

Specifically, in this embodiment, first, immediately after acceleration, since increase in the engine torque is limited so as to suppress vibration which occurs at the time of the lost motion of the transmission system to which engine torque is transmitted, it is possible to appropriately suppress the vibration which may occur at the time of the lost motion. Next, at the start of the rolling movement of the power train PT, since increase in the engine torque is limited so as to control the initial speed of the rolling movement of the power train PT, it is possible to improve controllability of the rolling movement of the power train PT, and as a result, suppression of the rolling movement of the power train PT becomes easier. Next, during the rolling movement of the power train PT, since increase in the engine torque is limited to the extent that the rolling movement is suppressed, the rolling movement by the power train PT may be produced at a lower speed, and the first engine mount Mt1 may be quickly damped to appropriately reduce the rolling movement of the power train PT.

Next, in this embodiment, since the engine torque is increased to cancel the limit of increase in the engine torque so as to override the reaction force generated when the drive shaft DS twisted under the torque transmitted from the engine E restores its untwisted state, the power train PT may be prevented from being pushed backward by the reaction force of the drive shaft DS to appropriately keep a condition in which a force is applied to the power train PT toward a driving direction. This operation may suppress another rolling movement or the like of the power train PT to be produced. Next, since the engine torque is increased so that the engine torque may reach the required torque (the basic target torque) corresponding to the accelerator actuated amount, it is possible to make the engine torque reach the required torque corresponding to the accelerator actuated amount quickly to improve acceleration performance.

[Modifications]

In the above embodiment, there is shown an example in which the present invention is applied to the engine E as a diesel engine, but application of the present invention is not limited thereto. The present invention may also be applied to a gasoline engine.

In addition, in the above embodiment, although there is shown an example in which the present invention is applied to a configuration where the power train PT is fixed to a vehicle by the pendulum type mechanism, the present invention may be also applied to a configuration where the power train PT is fixed to a vehicle by a mounting mechanism other than the pendulum type.

What is claimed is:

1. An engine control device, comprising
an engine speed acquirer that acquires an engine speed,
an accelerator actuated amount acquirer that acquires an accelerator actuated amount,
a torque controller that determines an angular speed change ratio and angular jerk of a crank shaft from the engine speed acquired by the engine speed acquirer, wherein
the torque controller determines whether a rolling movement of a power train occurs or not and switches between first and second control states in accordance with the determined result,
when the accelerator actuated amount starts to increase and the rolling movement occurs, the torque controller switches to the first control state in which the engine limits an increase in an engine torque so as to make an actual increase rate of the engine torque smaller than a nominal increase rate of the engine torque according to an increase in the accelerator actuated amount, to suppress the rolling movement,
when the angular jerk descends to a predetermined value or lower and the angular speed change ratio starts to decrease, the torque controller switches to the second control state in which the engine starts increasing the engine torque, and
the actual increase rate of the second control state is larger than that of the first control state.

2. The engine control device according to claim 1, wherein the torque controller determines a start timing and an end timing of the control for limiting increase in the engine torque based on at least one of the angular speed, the angular acceleration and the angular jerk.

3. The engine control device according to claim 1, wherein the torque controlling unit:
calculates the angular jerk of the crank shaft, and a ratio of change of the angular speed which is determined based on values of the angular speed taken at successional timings along a time axis with regard to the angular speed of the crank shaft, based on the engine speed acquired by the engine speed acquiring unit; and
starts to limit the increase in the engine torque so as to suppress the rolling movement of the power train, when the angular jerk is of a positive value and the ratio of change of the angular speed exceeds a predetermined value which is equal to or larger than 1.

4. The engine control device according to claim 1, wherein the actual increase rate of the engine torque of the second control state equal to or higher than the increase rate of the engine torque according to the increase in the accelerator actuated amount, in order to override the reaction force.

5. The engine control device according to claim 1, wherein, the torque controlling unit acquires a transmission gear stage from a transmission and in accordance with the transmission gear stage, the torque controller operates the engine to change the increase rate of the engine torque.

6. The engine control device according to claim 1, wherein the torque controller:
sets a target acceleration of the vehicle based on the accelerator actuated amount;
operates the engine to increase the engine torque according to the increase in the accelerator actuated amount by using a target engine torque for realizing the target acceleration; and
changes the target engine torque when the actual increase rate of the engine torque is changed from the nominal increase rate of the engine torque according to the increase in the accelerator actuated amount.

7. The engine control device according to claim 1, wherein the engine speed acquirer acquires the engine speed at least two times or more, within a range of 180 degrees of a crank angle.

8. The engine control device according to claim 1, wherein, by using a pendulum type, the power train is fixed to the vehicle body by the engine mount.

9. A method for controlling an engine, comprising steps of:
acquiring an engine speed;
acquiring an accelerator actuated amount; and
determining an angular speed ratio and angular jerk of a crank shaft from the acquired engine speed;
determining whether a rolling movement of a power train occurs or not and switching between first and second control states in accordance with the determined result;
when the accelerator actuated amount starts to increase and the rolling movement occurs, limiting an increase in an engine torque so as to make an actual increase rate of the engine torque smaller than a nominal increase rate of the engine torque according to an increase in the accelerator actuated amount, to suppress the rolling movement; and
when the angular jerk descends to a predetermined value or lower and the angular speed change ratio starts to decrease, switching to the second controls state in which the engine starts increasing the engine torque, wherein
the actual increase rate of the second control state is larger than that of the first control state.

\* \* \* \* \*